UNITED STATES PATENT OFFICE.

EDWARD HUBBARD RUSSELL, OF PARK CITY, UTAH TERRITORY.

PROCESS OF EXTRACTING PRECIOUS METALS FROM ORES.

SPECIFICATION forming part of Letters Patent No. 295,816, dated March 25, 1884.

Application filed October 25, 1883. (No specimens.)

*To all whom it may concern:*

Be it known that I, EDWARD H. RUSSELL, of Park City, in the county of Summit, and in the Territory of Utah, have invented certain new and useful Improvements in Processes of Extracting Precious Metals from Ores and Metallurgical Products; and I do hereby declare that the following is a full, clear, and exact description thereof.

The object of this invention is to provide an improvement in the process of extracting metals from ores and metallurgical products; and to this end it consists in the process as hereinafter described, and more specifically pointed out in the claims.

In the ordinary process of leaching ores and metallurgical products with a hyposulphite solution, the ore or product, which has been first leached with water to remove the salts soluble in the latter and existing in said ore or product or formed therein in the process of roasting, is leached with a solution of a hyposulphite of an alkali or alkali earth. This is usually done by leaching, but can be done in any other of the ways well known to those familiar with the art of treating ores for the extraction of metals therefrom. In the case of raw ores and some metallurgical products no previous leaching with water, as described above, is necessary. The hyposulphite solution dissolves out and removes from the ore or product the chloride of silver and one or two compounds of gold and other metals. The great objection to the use of the simple hyposulphite solution is that while the compounds above referred to are dissolved and removed by it the ores or metallurgical products often contain metallic silver, sulphide of silver and gold, and sometimes compounds of silver with arsenic or antimony, which are not at all or but slightly attacked by such solution. The metallic silver and the metallic compounds just enumerated consequently remain in the ore or product, and are thrown away with the tailings when the simple hyposulphite solution is used.

The object of my present invention is to save such valuable compounds and metallic silver by removing them from the ore. This I do by subjecting the ores or metallurgical products to the dissolving action of a new leaching solution in place of the ordinary simple hyposulphite one.

The solution which I have invented consists of the ordinary hyposulphite solution with a salt or soluble compound of copper added thereto.

The compounds or salts of copper which I contemplate using are the sulphate, (blue-stone,) chloride, nitrate, carbonate, and acetate thereof, cupreous carbonate, ammoniated copper, and hydrate of copper. Such salts or compounds I have found by experiment render the hyposulphite solution capable of attacking and dissolving metallic silver, sulphide of silver and gold, and certain compounds of antimony and arsenic with silver, which the ordinary hyposulphite solution acted upon but little or not at all. When any one of said salts or compounds of copper is added to a hyposulphite solution, I have found that the double salt of cupreous hyposulphite and sodium hyposulphite is formed in the solution, and that it is this double salt which acts with such energy and brings metallic silver, sulphide of silver and gold, and the compounds of silver with arsenic and antimony set forth above into solution. The solution containing the double salt is also capable of dissolving out thoroughly the chloride of silver and one or two compounds of gold, which the simple hyposulphite solution is ordinarily used to remove. The compounds or salts of copper I have named in the order of their effectiveness, the hydrate being the least effective.

In practice I make the solution by adding to a solution containing from one to five per cent. of hyposulphite of an alkali or alkali earth one to three per cent. of one of the above-named compounds or salts of copper soluble in the solution.

In carrying out my process, the ore or metallurgical product is subjected to the dissolving action of the solution so made, which dissolves out and removes the metallic silver as well as the metallic compounds referred to above. The resultant solution is then drawn off or removed, and the metals are precipitated therefrom in the usual way as sulphides.

My solution can be used to advantage on unroasted ores, ores that have been roasted in a furnace, those that have been subjected to the action of chlorine-gas, and on metallurgical products.

As indicated already herein, the ore or product can be subjected to the dissolving action of the compound solution in any of the ways well known to those familiar with the treatment of ores with chemical solutions. For instance, instead of leaching said ore or product by pouring the solution on the mass thereof from above and letting it work down through, the ore or product can be immersed in said solution contained in a suitable tank, and then withdrawn therefrom after being subjected to the solvent action of the solution a sufficient time. I do not therefore limit myself in my claims to any particular manner of subjecting the ore to the action of my leaching solution.

The process described and claimed in this application differs from those claimed in applications No. 67,001 and No. 101,783, filed by me July 17, 1882, and July 24, 1883, respectively, in that in the carrying out of this process the ore or product is subjected to the solvent action of my leaching solution without first being leached with or otherwise subjected to the solvent action of the ordinary hyposulphite solution, while in the processes covered by the applications referred to such ordinary hyposulphite solution is first used upon the ore or product to remove the chloride of silver, and then my solution is used to remove the metallic silver and metallic compounds still remaining in said ore or product.

What I claim herein is—

1. The process of removing precious metals from ores and metallurgical products, which consists in subjecting the ore or product to the dissolving action of a solution containing a hyposulphite to which has been added a soluble compound or salt of copper, substantially as described.

2. The process of removing precious metals from ores and metallurgical products, which consists in subjecting the ore or product to the dissolving action of a solution containing a hyposulphite to which has been added sulphate of copper, substantially as described.

3. The process of removing precious metals from ores and metallurgical products, which consists in leaching the ore or product with a hyposulphite solution to which has been added a soluble compound or salt of copper in the proportions substantially as described.

4. The process of removing precious metals from ores and metallurgical products, which consists in subjecting the ore or product to the dissolving action of a solution containing the double salt of cuprous hyposulphite and sodium hyposulphite, substantially as described.

In testimony that I claim the foregoing I have hereunto set my hand this 16th day of October, A. D. 1883.

EDWARD HUBBARD RUSSELL.

Witnesses:
 JAMES MOFFAT,
 P. PORTER.